(12) United States Patent
Jang et al.

(10) Patent No.: US 10,622,851 B2
(45) Date of Patent: Apr. 14, 2020

(54) MOTOR HAVING STATOR WITH COUPLED TEETH

(71) Applicants: NEW MOTECH CO., LTD., Gwangju (KR); INDUSTRY ACADEMIC COOPERATION FOUNDATION, KUNSAN NATIONAL UNIVERSITY, Gunsan-si, Jeollabuk-do (KR)

(72) Inventors: Jeong Cheol Jang, Gwangju (KR); Ji Min Lee, Gwangju (KR); Gyeong Sik Yang, Gwangju (KR); Seung Hoon Lee, Gwangju (KR); Byung Taek Kim, Gunsan-si (KR); Nam Jong Kim, Gwangju (KR)

(73) Assignees: NEW MOTECH CO., LTD., Gwangju (KR); INDUSTRY ACADEMIC COOPERATION FOUNDATION, KUNSAN NATIONAL UNIVERSITY, Gunsan-si, Jeollabuk-do (KR)

(*) Notice: Subject to any disclaimer, the term of this patent is extended or adjusted under 35 U.S.C. 154(b) by 64 days.

(21) Appl. No.: 15/774,280

(22) PCT Filed: Oct. 6, 2016

(86) PCT No.: PCT/KR2016/011187
§ 371 (c)(1),
(2) Date: May 8, 2018

(87) PCT Pub. No.: WO2017/111267
PCT Pub. Date: Jun. 29, 2017

(65) Prior Publication Data
US 2018/0323662 A1 Nov. 8, 2018

(30) Foreign Application Priority Data
Dec. 24, 2015 (KR) .................. 10-2015-0185978

(51) Int. Cl.
*H02K 1/16* (2006.01)
*H02K 21/22* (2006.01)
(Continued)

(52) U.S. Cl.
CPC ............ *H02K 1/165* (2013.01); *H02K 1/2786* (2013.01); *H02K 21/14* (2013.01); *H02K 21/22* (2013.01); *H02K 2213/03* (2013.01)

(58) Field of Classification Search
CPC ...... H02K 1/165; H02K 21/14; H02K 1/2786; H02K 2213/03; H02K 21/22; H02K 1/16; H02K 1/146
(Continued)

(56) References Cited

U.S. PATENT DOCUMENTS

| 4,280,072 A | * | 7/1981 | Gotou | ............... H02K 1/08 310/156.26 |
| 4,947,066 A | | 8/1990 | Ghibu et al. | |

(Continued)

FOREIGN PATENT DOCUMENTS

| CN | 105071620 A | * | 11/2015 |
| CN | 105071620 A | | 11/2015 |

(Continued)

OTHER PUBLICATIONS

Machine Translation, Zhao, CN-105071620-A, Nov. 2015. (Year: 2015).*

(Continued)

*Primary Examiner* — Thomas Truong
(74) *Attorney, Agent, or Firm* — Revolution IP, PLLC

(57) ABSTRACT

A motor having a stator with coupled teeth according to the present invention includes a stator which includes a circular base, a plurality of poles radially formed in the base, and a plurality of teeth formed on an outer diameter of the pole; and a rotor which includes a rotor housing in which the (Continued)

stator is positioned inside and a plurality of magnets facing the teeth are formed on an inner wall, wherein two teeth are symmetrically formed on an outer diameter portion for each pole, and the number of teeth is twice the number of poles.

6 Claims, 5 Drawing Sheets

(51) Int. Cl.
*H02K 1/27* (2006.01)
*H02K 21/14* (2006.01)

(58) Field of Classification Search
USPC ..... 310/216.064, 216.071–216.079, 216.091
See application file for complete search history.

(56) References Cited

U.S. PATENT DOCUMENTS

| | | |
|---|---|---|
| 5,289,064 A | 2/1994 | Sakamoto |
| 7,143,503 B2 | 12/2006 | Ionel et al. |
| 2001/0048264 A1* | 12/2001 | Trago ................ H02K 1/278 310/254.1 |
| 2004/0245887 A1 | 12/2004 | Fujinaka |
| 2009/0160287 A1* | 6/2009 | Nakagawa ............ H02K 1/146 310/216.057 |

FOREIGN PATENT DOCUMENTS

| | | |
|---|---|---|
| JP | 05-111233 A | 4/1993 |
| JP | 2000-197336 A | 7/2000 |
| JP | 2003-061326 A | 2/2003 |
| JP | 2009-153305 A | 7/2009 |
| KR | 10-2009-0067057 A | 6/2009 |

OTHER PUBLICATIONS

International Search Report for PCT/KR2016/011187 dated Jan. 9, 2017 from Korean Intellectual Property Office.
Byungtaek Kim et al., "Operation and Design Principles of a PM Vernier Motor", IEEE Transactions on Industry Applications, vol. 50, No. 6, Nov./Dec. 2014, pp. 3656-3663.

* cited by examiner

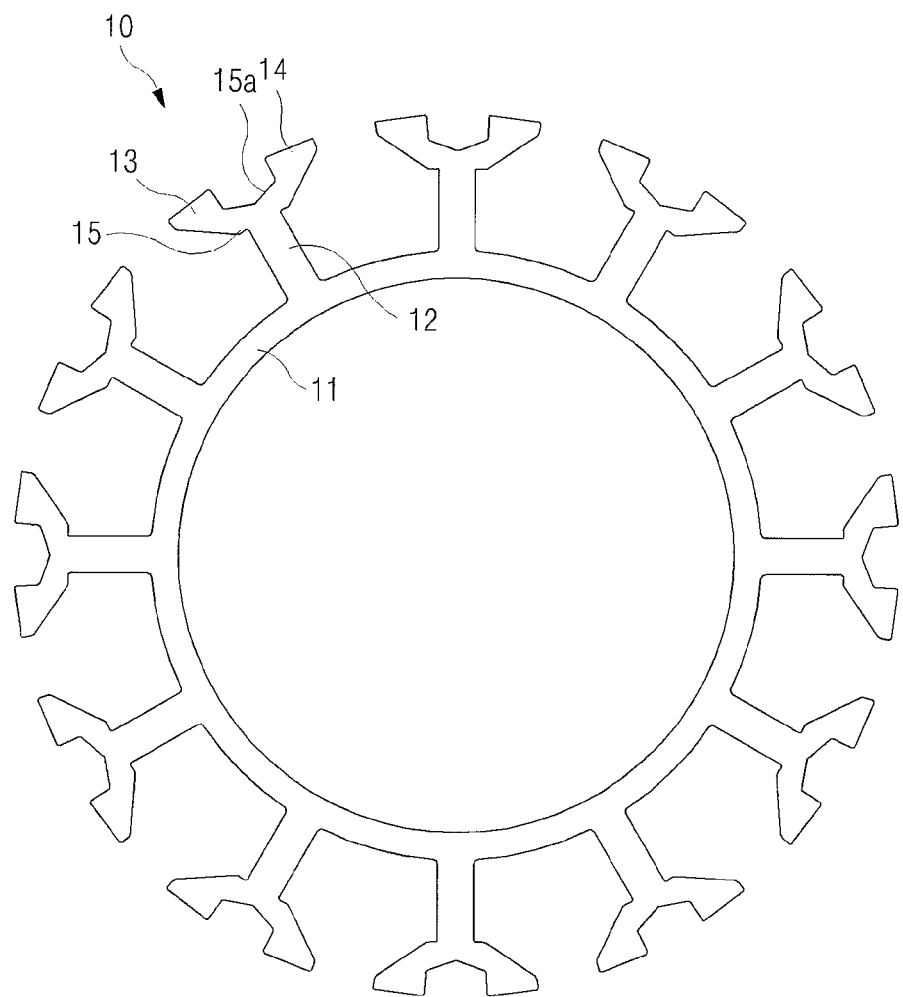
[Fig. 2]

[Fig. 3]
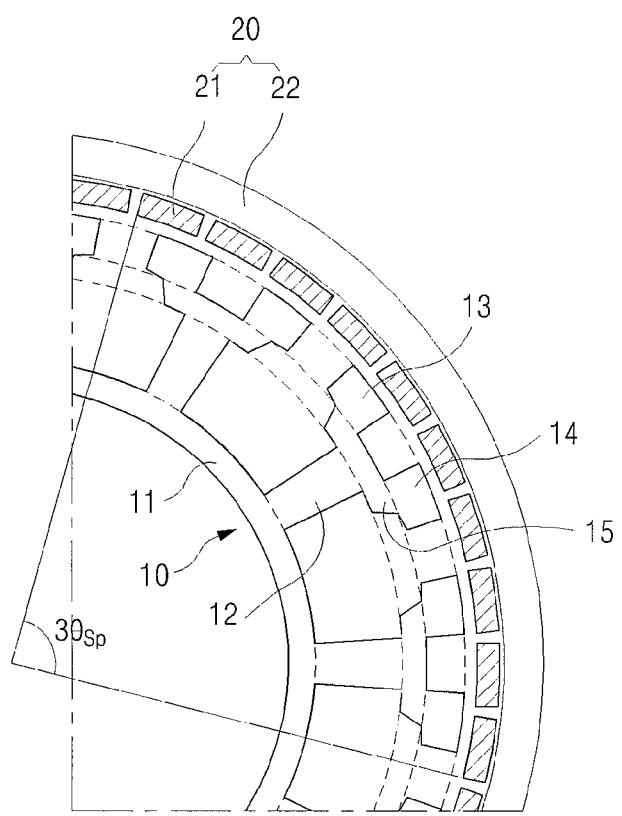

[Fig. 4]
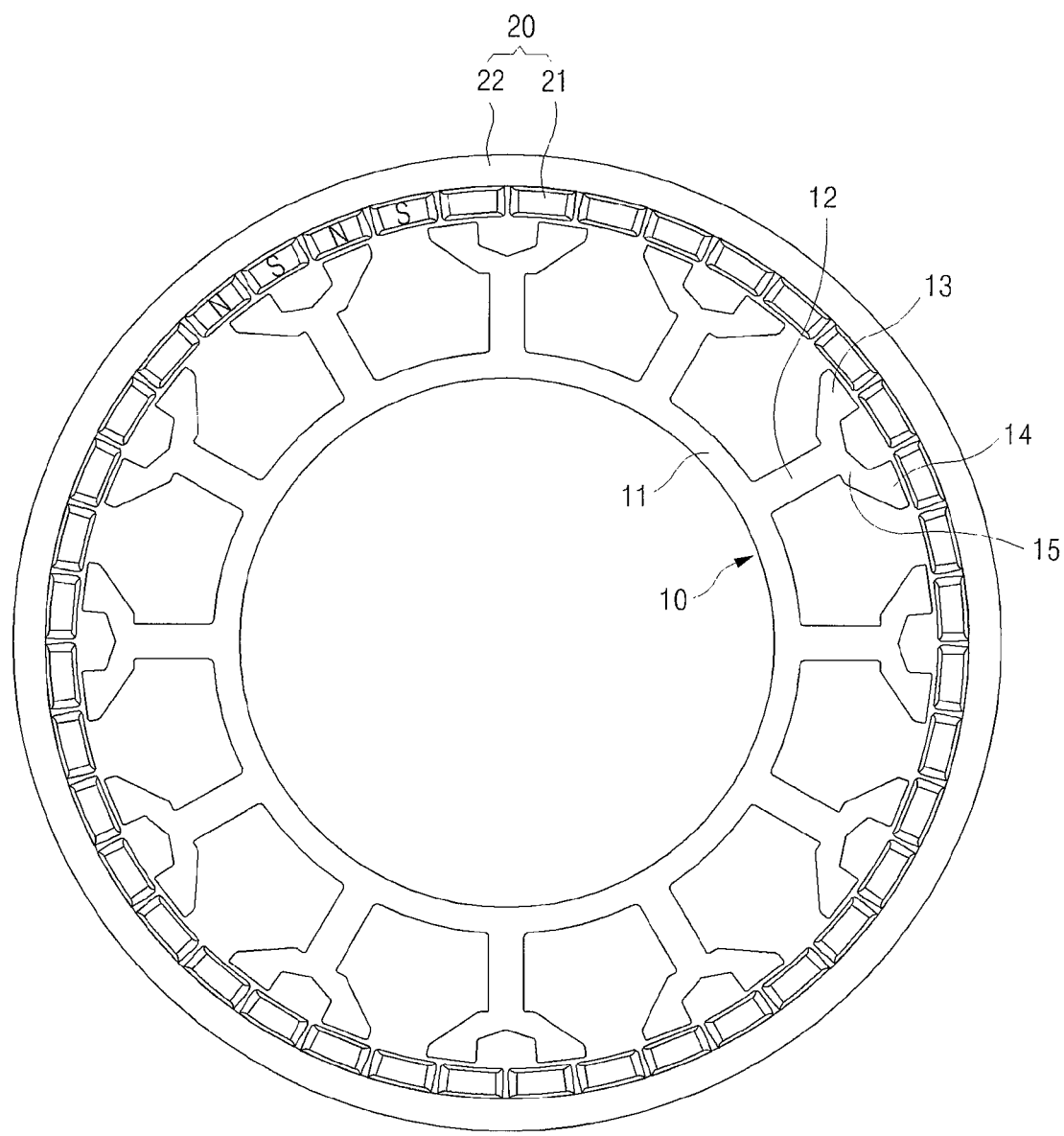

[Fig. 5]
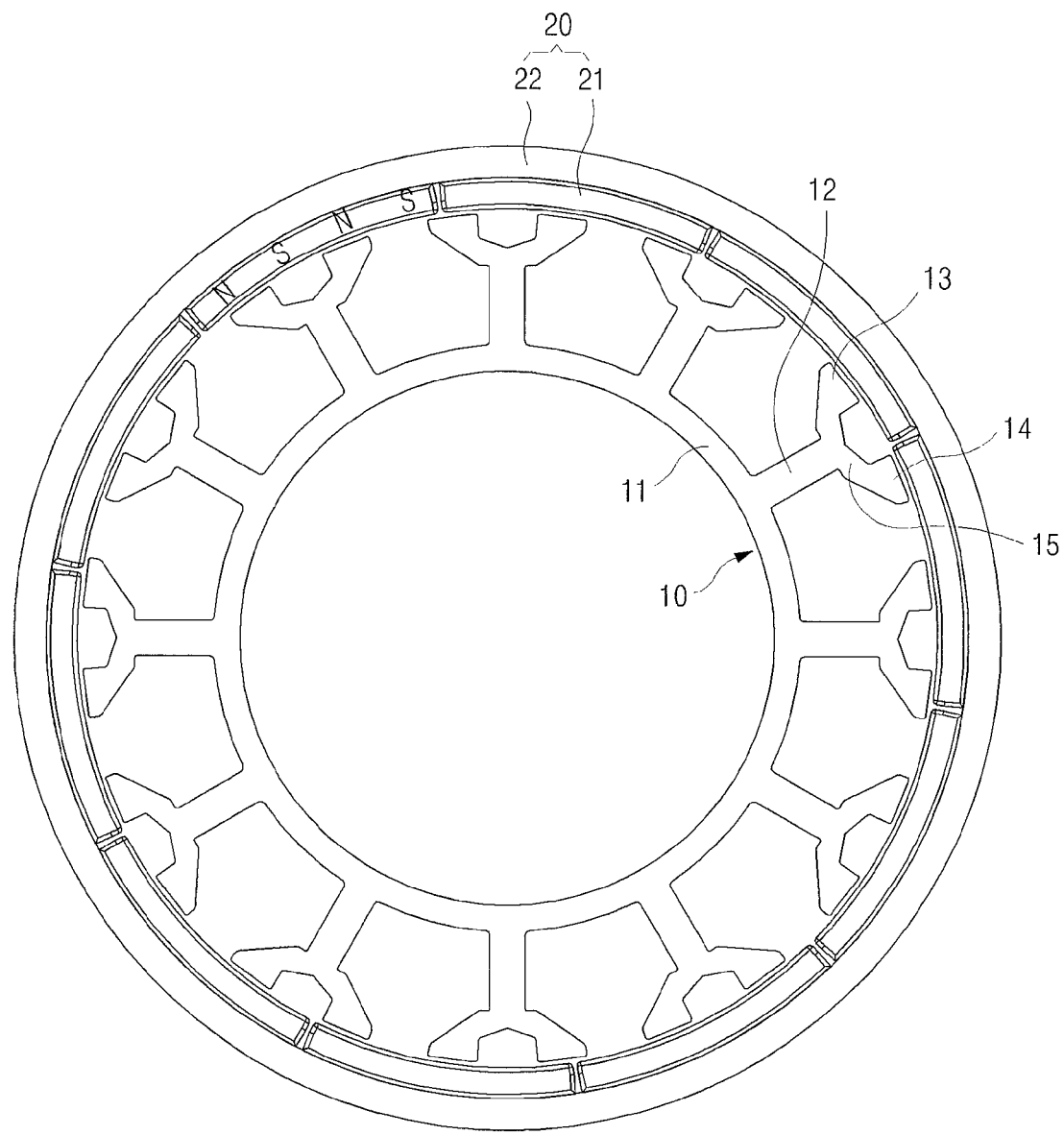

MOTOR HAVING STATOR WITH COUPLED TEETH

TECHNICAL FIELD

The present invention relates to a motor. More specifically, the present invention relates to a motor which includes a stator with a structure capable of increasing counter electromotive force and the number of coils in the stator by fully obtaining a vernier effect.

BACKGROUND ART

Vernier reluctance motors have been known for about 50 years, and a concept of vernier permanent magnet motors was suggested about 20 years ago. According to the recent research, it is reported that the vernier permanent magnet motors may obtain an output increase of a motor by the increase of counter electromotive force when considering air-gap permeance between teeth of a stator and a magnet of a rotor (Byungtaek Kim et al., "Operation and Design Principles of a PM Vernier Motor", IEEE Transactions on Industry Applications, Vol. 50, No. 6, pp. 3656-3662).

In order to increase the counter electromotive force, it is necessary to make a change of magnetic flux density according to rotation of the motor bigger by increasing the number of pole pairs of the magnet to be significantly greater than that of a slot in consideration of correlation between the air-gap permeance and magnetic flux density which occur according to the rotation of the motor. The air-gap permeance according to an air gap between the teeth of a stator core and a rotor magnet may be indicated in the form of sine wave according to a phase. Magneto-motive force by the magnet is indicated by a sine wave according to the number of pole pairs and phase of the magnet. Accordingly, the magnetic flux density represented by multiplication of the air-gap permeance and magneto-motive force may be indicated as a sum of two sine waves. The sum of two sine waves may be maximized according to the number of pole pairs of the magnet, the number of slots and the arrangement of coil. This effect is called as a vernier effect or a modulation effect.

Meanwhile, in case of increasing the number of pole pairs of the magnet and designing the number of slots to be smaller than that of pole pairs of the magnet, when increasing the number of coils in order to obtain the vernier effect, an amount of coils wound in the stator increases. This does not cause any problems when a laminating (stack) height of the stator core is high enough. However, in the case of a motor with a slim shape whose stack height is not high enough, there would be a difficulty in maintaining the shapes of the stator and motor as the number of coils increases.

The present inventors suggest a motor with a new structure capable of solving the above-mentioned problems and fully obtaining the vernier effect.

DISCLOSURE OF INVENTION

Technical Problem

It is an object of the present invention to provide a motor of a new structure with improved output.

It is another object of the present invention to provide a motor capable of increasing the number of coils even when a laminating height of a stator is not high enough.

The objects above of the present invention and other objects included therein may be easily achieved by the present invention explained in the following.

Solution to Problem

A motor having a stator with coupled teeth according to the present invention includes a stator which includes a circular base, a plurality of poles radially formed in the base, and a plurality of teeth formed on an outer diameter of the pole; and a rotor which includes a rotor housing in which the stator is positioned inside and a plurality of magnets facing the teeth are formed on an inner wall, wherein two teeth are symmetrically formed on an outer diameter portion for one pole each, and the number of teeth is twice the number of poles.

According to the present invention, it is preferable that a ratio between a slot opening which is a space between the teeth and neighboring teeth and a slot pitch which is a space between the poles is from 0.5 to 0.6.

According to the present invention, the two teeth formed in the one pole may be connected to each other by a bridge, and the bridge may have a shape connecting the outer diameter portion of the pole and the inner diameter portion of the two teeth.

According to the present invention, a groove may be formed in the outer diameter portion of the bridge in the direction of inner diameter.

According to the present invention, the outer diameter portion of the bridge may have a circular arc shape.

According to the present invention, the outer diameter portion of the bridge may have a straight line shape.

According to the present invention, when defining a distance between the pole and neighboring poles as a slot pitch, it is preferable that a ratio between the number of poles of the magnet and the slot pitch is 10:3.

Advantageous Effects of Invention

The present invention provides a motor of a new structure which can fully utilize the vernier effect, thereby increasing the counter electromotive force and output of the motor, and increasing the number of coils even when the laminating height of the stator is not high enough.

BRIEF DESCRIPTION OF DRAWINGS

FIG. 2 is a plan view illustrating another embodiment of a stator of a motor according to the present invention;

FIG. 3 is a conceptual diagram illustrating a relation between a stator and a rotor magnet in the motor according to the present invention;

FIG. 4 is a plan view illustrating both the stator and rotor in the motor according to the present invention; and FIG. 5 is a plan view illustrating both the stator and rotor using a particular magnetization magnet in the motor according to the present invention.

Figure 1:
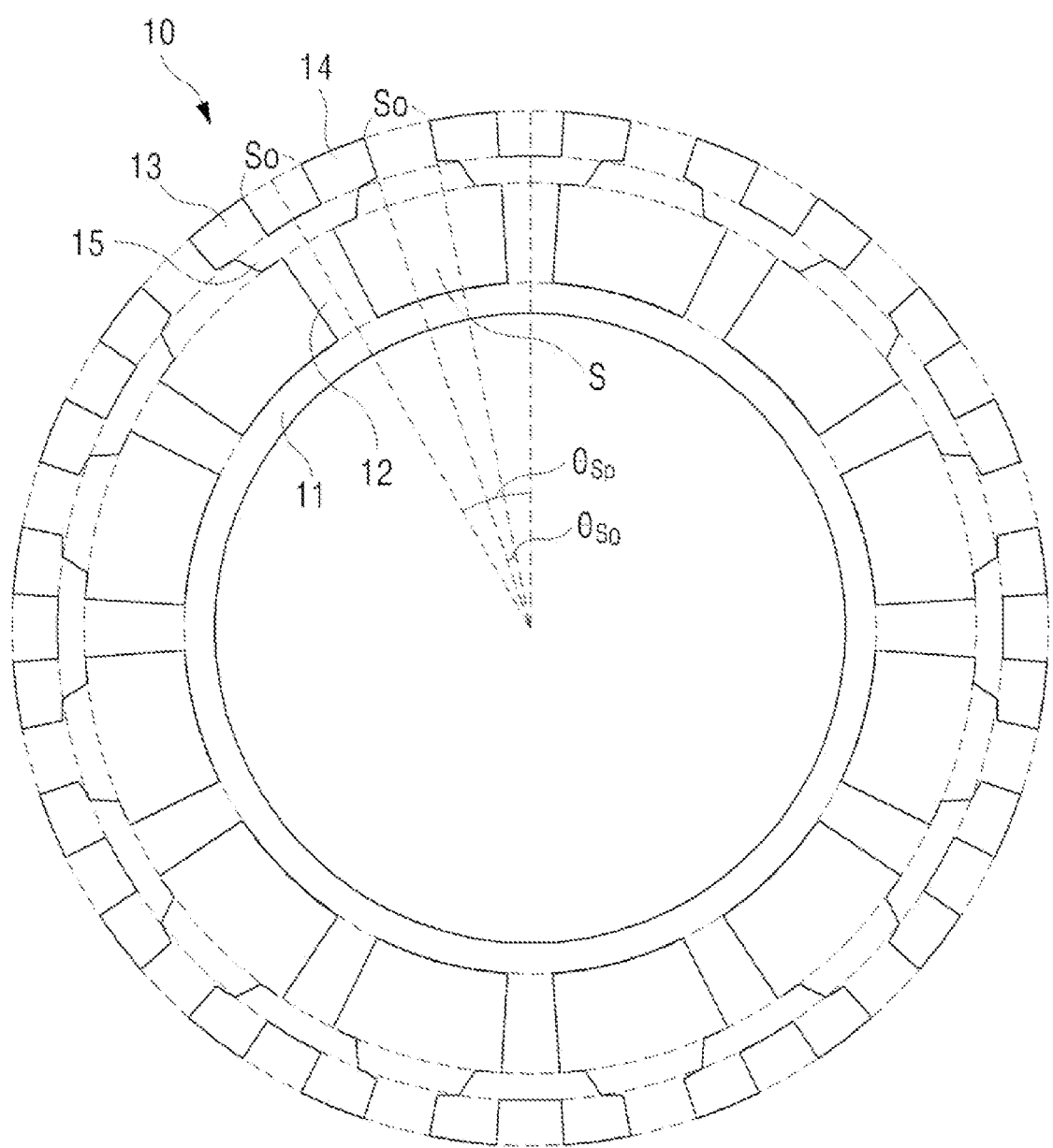
FIG. 1 is a plan view illustrating an embodiment of a stator of a motor according to the present invention.

Hereinafter, the present invention will be described in detail with reference to the accompanying drawings.

MODE FOR THE INVENTION

FIG. 1 is a plan view illustrating an embodiment of a stator 10 of a motor according to the present invention, and FIG. 2 is a plan view illustrating another embodiment of a stator of a motor according to the present invention As illustrated in FIG. 1 and FIG. 2, a stator 10 of a motor according to the present invention includes a circular base 11, a plurality of poles 12 radially formed in the circular base 11, first and second teeth 13 and 14 with symmetrical shape at locations symmetrical to each other at the end of the pole, and a bridge 15 connecting the first and second teeth 13 and 14.

In general, a stator or a stator assembly includes a stator core manufactured by laminating a plurality of thin steel plates, an insulator which insulates a base, pole and teeth of the stator core, and a coil wound in the insulated pole. The term 'a stator' used herein may mean 'a stator core' or a case including the stator, insulator and coil. In the present specification, most of explanation on the insulator and coil will be omitted for the sake of convenience.

A space between the pole 11 and its neighboring poles is a slot S. A size of one slot refers to a slit pitch Sp. Two teeth 13 and 14 are formed at the end of each pole 11. The two teeth 13 and 14 are located with a constant distance therebetween. A distance between the teeth refers to a slot opening So. According to the present invention, it is preferable to include 12 poles and 24 teeth in the stator as illustrated in FIG. 1 and FIG. 2. However, as long as two teeth are formed in one pole, the present invention is not necessarily limited to those numbers. For example, a stator including 6 poles and 12 teeth is possible, and a stator including 18 poles and 36 teeth is also possible. In the present specification, a form where two teeth are formed in one pole, that is, one pole including two teeth will be referred to as coupled teeth.

These coupled teeth, that is, the first and second teeth 13 and 14, have symmetrical shape at locations which are symmetrical to each other. Thus, in the present invention, it is preferable that a ratio between the slot opening ($\theta_{So}$) and slot pitch ($\theta_{Sp}$) is 0.5, but the present invention is not necessarily limited thereto. When the ratio is formed in the range between 0.5 and 0.6, the vernier effect can be fully obtained.

The bridge 15 is connected to the outer diameter portion of the pole 12 while connecting the inner diameter portion of the first teeth 13 and second teeth 14. A shape of the bridge 15 also has a symmetrical shape with respect to the pole 12. A shape of the outer diameter portion of the bridge 15, that is, the portion located at the slot opening So may have a circular arc shape as illustrated in FIG. 1, or may have a straight line shape. More preferably, a groove 15a may be formed in the direction of inner diameter as illustrated in FIG. 2. It is preferable that a depth of the groove 15a is formed to the outer diameter portion of the pole 12. By means of the groove 15a, it is expected that an output would increase through the modulation effect. A shape or number of the groove 15a may be modified in a various way other than the shape illustrated in FIG. 2 and applied.

The stator 10 of the motor according to the present invention ties two teeth in one pole, so that the slot which is a space between the poles increases in size. Thus, it is advantageous to increase the number of coils.

FIG. 3 is a conceptual diagram illustrating a relation between a stator 10 and a rotor magnet 21 in the motor according to the present invention, and FIG. 4 is a plan view illustrating both the stator 10 and rotor 20 in the motor according to the present invention.

Referring to FIG. 3 and FIG. 4 together, the motor according to the present invention includes the stator 10 and rotor 20. The rotor 20 includes a cup-shaped rotor housing 21 in which the stator 10 is located inside, and a plurality of magnets 21 installed on the inner wall of the rotor housing 21. The magnet 21 is located while facing the coupled teeth 13 and 14 of the stator 10. A distance between the magnet 21 and an outer diameter surface of the teeth refers to an air-gap. Alternatively, a distance between the outer diameter portion of the bridge 15, which is the inner diameter portion of the slot opening, or the outer diameter portion of the base 11 and the magnet 21 also refers to an air-gap. A difference in permeance according to the air-gap is particularly considered for the vernier effect.

It is advantageous in terms of manufacturing costs to use a general ferrite permanent magnet for the magnet 21. However, alnico magnet, neodymium magnet, samarium cobalt magnet, rubber magnet, etc. whose magnetic force, coercive force, etc. are different may be used. Also, for the magnet 21, a general magnetization magnet magnetized only by north-seeking pole or south-seeking pole on the top surface and bottom surface may be used, or a particular magnetization magnet where north-seeking pole and south-seeking pole are consecutively magnetized together on the top surface or bottom surface may also be used. A single of or a plurality of pairs of north-seeking pole and south-seeking pole are magnetized on the top surface and bottom surface of the particular magnetization magnet.

In the present invention, the number of magnets 21 is not specifically limited. However, in the case of a general magnetization magnet, it is preferable to use ten magnets per three slot pitches ($3\theta_{Sp}$). In other words, when the distance between the pole and its neighboring poles is defined as the slot pitch, a ratio between the number of the magnets or the number of poles and the slot pitch is 10:3.

Accordingly, when a general magnetization magnet is used, in the case of a motor with 12 slots and 36 teeth as illustrated in FIG. 3 and FIG. 4, 40 magnets are used. As long as ten general magnetization magnets per three slot pitches ($3\theta_{Sp}$) is used, the present invention is not limited to these numbers. For example, in the case of a motor with 9 slots and 18 teeth, 30 magnets are used. In the case of a motor with 18 slots and 36 teeth, 60 magnets are used. The number of magnets is a suitable structure to obtain the vernier effect and may improve the output of the motor through the increase of counter electromotive force.

Meanwhile, when using a particular magnetization magnet as illustrated in FIG. 5, the number of magnets may be reduced. Referring to FIG. 5, in the case of a motor with 12 slots and 36 teeth, two pairs of north-seeking poles and south-seeking poles are consecutively magnetized on the top surface of one magnet. Accordingly, in this case, the number of magnets 21 is 10. As another example, in case of using a particular magnetization magnet where a pair of north-seeking pole and south-seeking pole is magnetized on the top surface of one magnet, 20 magnets are used.

Accordingly, when using the particular magnetization magnet, in the case of the particular magnetization magnet where n pairs of north-seeking pole and south-seeking pole are consecutively magnetized on the top surface and bottom surface of the magnet, a ratio between the number of magnets and the slot pitch becomes (10/(2n)):3 (Here, n refers to a natural number). In this case, a ratio between the number of poles of the magnet and the slot pitch becomes 10:3, like the general magnetization magnet.

The detailed description of the present invention explained as above simply explains one or more examples for understanding the present invention, but does not intend to limit the scope of the present invention. The scope of the present invention is determined by the accompanying claims. Additionally, it should be construed that a simple modification or change falls under the protection scope of the present invention.

The invention claimed is:

1. A motor, comprising:
   a stator comprising
   a circular base,
   a plurality of poles radially formed in the base, and
   a plurality of teeth formed on an outer diameter portion of each pole; and
   a rotor comprising a rotor housing in which the stator is positioned inside and a plurality of magnets facing the teeth are formed on an inner wall,
   wherein two teeth are symmetrically formed on the outer diameter portion of the each pole, and the number of teeth is twice the number of poles,
   wherein a ratio between a slot opening which is a space between the teeth and neighboring teeth and a slot pitch which is a space between the poles is from 0.5 to 0.6,
   wherein a groove is formed in a direction of inner diameter portion and a depth of the groove is formed in the outer diameter portion of the each pole.

2. The motor according to claim 1, wherein the two teeth formed in the one pole are connected to each other by a bridge, and the bridge has a shape connecting the outer diameter portion of the each pole and the inner diameter portion of the two teeth.

3. The motor according to claim 2, wherein the groove is formed in an outer diameter portion of the bridge in the direction of inner diameter.

4. The motor according to claim 2, wherein the outer diameter portion of the bridge has a circular arc shape.

5. The motor according to claim 2, wherein the outer diameter portion of the bridge has a straight line shape.

6. The motor according to claim 1, wherein when defining a distance between the one pole and neighboring poles as a slot pitch, a ratio between the number of poles of the magnet and the slot pitch is 10:3.

* * * * *